(12) United States Patent
Mossberg et al.

(10) Patent No.: US 9,348,091 B2
(45) Date of Patent: May 24, 2016

(54) MULTIPLEXER/DEMULTIPLEXER BASED ON DIFFRACTION AND REFLECTION

(71) Applicant: Finisar Corporation, Sunnyvale, CA (US)

(72) Inventors: Thomas W. Mossberg, Eugene, OR (US); Christoph M. Greiner, Eugene, OR (US); Dmitri Iazikov, Eugene, OR (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 14/578,420

(22) Filed: Dec. 20, 2014

(65) Prior Publication Data
US 2015/0180584 A1 Jun. 25, 2015

Related U.S. Application Data

(60) Provisional application No. 61/927,469, filed on Jan. 14, 2014, provisional application No. 61/919,683, filed on Dec. 20, 2013.

(51) Int. Cl.
*H04J 14/02* (2006.01)
*G02B 6/293* (2006.01)

(52) U.S. Cl.
CPC ........ *G02B 6/29307* (2013.01); *G02B 6/29311* (2013.01); *H04J 14/02* (2013.01)

(58) Field of Classification Search
CPC .. G02B 6/29307; G02B 6/29311; H04J 14/02
USPC ........................................ 398/79, 82, 84, 87
See application file for complete search history.

(56) References Cited

U.S. PATENT DOCUMENTS

| 6,823,106 | B2 | 11/2004 | Takushima et al. | |
|---|---|---|---|---|
| 7,190,856 | B1* | 3/2007 | Iazikov | G02B 6/12007 385/132 |
| 7,330,614 | B1* | 2/2008 | Mossberg | G02B 6/12007 356/328 |
| 7,480,428 | B2 | 1/2009 | Tien | |
| 2004/0179779 | A1* | 9/2004 | Greiner | G02B 6/12023 385/37 |
| 2005/0018951 | A1* | 1/2005 | Mossberg | G02B 5/32 385/14 |
| 2010/0067912 | A1* | 3/2010 | Khan | G02B 6/29311 398/83 |

OTHER PUBLICATIONS

Co-owned U.S. Appl. No. 14/541,072, filed Nov. 13, 2014 (copy not provided—available in IFW).

* cited by examiner

*Primary Examiner* — Dalzid Singh
(74) *Attorney, Agent, or Firm* — David S. Alavi

(57) ABSTRACT

Transmissive diffraction grating(s), reflector(s), and multiple optical sources/receivers are arranged such that each one of multiple optical signals at corresponding different wavelengths co-propagating along a multiplexed beam path would: (i) be transmissively, dispersively diffracted at a multiplexed transmission region of a grating; (ii) propagate between the multiplexed transmission region and multiple demultiplexed transmission regions of a grating undergoing reflection(s) from the reflector(s); (iii) be transmissively, dispersively diffracted at the demultiplexed transmission regions; and (iv) propagate between the demultiplexed transmission regions and the sources/receivers along multiple demultiplexed beam paths.

35 Claims, 10 Drawing Sheets

US 9,348,091 B2

MULTIPLEXER/DEMULTIPLEXER BASED ON DIFFRACTION AND REFLECTION

BENEFIT CLAIMS TO RELATED APPLICATIONS

This application claims benefit of (i) U.S. provisional App. No. 61/919,683 filed Dec. 20, 2013 in the names of Thomas W. Mossberg, Christoph M. Greiner, and Dmitri Iazikov, and (ii) U.S. provisional App. No. 61/927,469 filed Jan. 14, 2014 in the names of Thomas W. Mossberg, Christoph M. Greiner, and Dmitri Iazikov; both of said provisional applications are incorporated by reference as if fully set forth herein.

BACKGROUND

The field of the present invention relates to optical multiplexers and demultiplexers. In particular, apparatus and methods are shown and described herein for multiplexing or demultiplexing optical signals at differing wavelengths using one or more diffractive optical elements and one or more reflective optical elements.

SUMMARY

An optical apparatus comprises one or more transmissive diffractive optical elements, one or more reflective optical elements, and a set of multiple optical sources or receivers. The diffractive optical element(s), the reflective optical element(s), and the optical sources or receivers are held in substantially fixed positions relative to one another. The diffractive optical element(s) include a multiplexed transmission region, and multiple demultiplexed transmission regions that are spatially displaced from one another. The relative positions and arrangements of the diffractive optical element(s), reflective optical element(s), and optical sources or receivers are such that each one of a set of multiple optical signals, at corresponding different selected signal wavelengths in an operational wavelength range, co-propagating to the multiplexed transmission region along a multiplexed beam path would (i) be transmissively, dispersively diffracted at the multiplexed transmission region, (ii) propagate between the multiplexed transmission region and a corresponding demultiplexed transmission region undergoing at least one reflection from at least one of the one or more reflective optical elements, (iii) be transmissively, dispersively diffracted at the corresponding demultiplexed transmission region, and (iv) propagate between the corresponding demultiplexed transmission region and a corresponding one of the set of multiple optical sources or receivers along a corresponding one of multiple demultiplexed beam paths.

In some example embodiments the set of multiple optical sources or receivers can comprise multiple photodetectors sensitive to optical signals in the operational wavelength range. Each photodetector is positioned so as to receive an optical signal in the operational wavelength range propagating from a corresponding demultiplexed transmission region along the corresponding demultiplexed beam path. A method for using such an embodiment comprises: (i) directing a multiplexed optical signal to propagate along the multiplexed beam path to the multiplexed transmission region, wherein the multiplexed optical signal comprises a corresponding optical signal at each of two or more different corresponding wavelengths in the operational wavelength range; and (ii) receiving each corresponding optical signal at the corresponding photodetector. Each corresponding optical signal propagates from the corresponding demultiplexed transmission region along the corresponding demultiplexed beam path to the corresponding photodetector.

In some example embodiments the set of multiple optical sources or receivers can comprise a set of multiple light sources emitting corresponding optical signals at corresponding wavelengths in the operational wavelength range. Each light source is positioned so as to launch the corresponding optical signal to propagate from the light source along a corresponding demultiplexed beam path to the corresponding demultiplexed transmission region. A method for using such an embodiment comprises emitting a corresponding optical signal from each of two or more of the light sources at two or more different corresponding wavelengths in the operational wavelength range to propagate along the corresponding demultiplexed beam path to the corresponding demultiplexed transmission region. The corresponding optical signals propagate from the multiplexed transmission region along or substantially parallel to the multiplexed beam path as a multiplexed optical signal.

An optical multiplexer or demultiplexer therefore can comprise one or more diffraction gratings and one or more reflectors arranged: (i) to demultiplex multiple optical signals emerging, e.g., from an optical fiber, an optical waveguide, or other optical element or transmission medium and carrying corresponding optical telecommunications signals (e.g., voice, data, and so on) onto an array of corresponding optical receivers (e.g., photodetectors, optical waveguides, optical fibers, or other optical elements or transmission media); or (ii) to multiplex multiple optical signals carrying corresponding optical telecommunications signals generated by an array of corresponding optical sources (e.g., laser diodes such as VCSELs, coupled directly or via corresponding optical waveguides, optical fibers, or other optical elements or transmission media) onto, e.g., a single optical fiber, optical waveguide, or other optical element or transmission medium. A first diffraction of incoming, wavelength-differentiated optical signals introduces wavelength-dependent angular dispersion and, after one or more reflections, a second diffraction of the optical signals partly or completely removes the angular dispersion from the outgoing, wavelength-differentiated optical signals; the net result is combination into a single beam (multiplexing) or separation into multiple beams (demultiplexing) of the wavelength-differentiated optical signals. Devices disclosed herein can also be described as spectral-spatial displacers, because they can be arranged so as to impart wavelength-dependent lateral dispersion of substantially parallel optical signal beams, in contrast to wavelength-dependent angular dispersion imparted by some other diffraction-based multiplexers or demultiplexers.

Objects and advantages pertaining to optical multiplexers or demultiplexers may become apparent upon referring to the example embodiments illustrated in the drawings or disclosed in the following written description. Subject matter disclosed herein may be related to subject matter disclosed in U.S. provisional App. Nos. 61/903,934 (filed Nov. 13, 2013) and 61/906,887 (filed Nov. 20, 2013), and U.S. non-provisional application Ser. No. 14/541,072 (filed Nov. 13, 2014), each filed in the names of Christoph M. Greiner, Thomas W. Mossberg, and Dmitri Iazikov; each of said provisional and non-provisional applications is incorporated by reference in its entirety.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically: all features may not be shown in full detail or in proper proportion, certain features or structures may be exaggerated relative to others for clarity, and the drawings should not be regarded as being to scale. For example, the actual diffractive lines or ridges or other diffractive features of the diffractive optical elements (e.g., typically hundreds or thousands of grating lines per millimeter) are omitted from the drawings for clarity. The embodiments shown are only examples: they should not be construed as limiting the scope of the present disclosure or appended claims.

DETAILED DESCRIPTION OF EMBODIMENTS

Multiplexing and demultiplexing of wavelength-differentiated communication channels is vital in modern communication systems. The example devices disclosed herein can provide convenient or low cost multiplexing or demultiplexing. The example devices generally comprise the use of a pair of diffraction gratings (or a single diffraction grating used twice); the first grating angularly disperses light beams according to wavelength and the second grating partly or completely removes the angular dispersion. The angularly dispersed beams undergo at least one reflection between the two gratings; the angularly dispersed beams separate (in a demultiplexer) or come together (in a multiplexer) as they propagate between the gratings. To the extent that the second grating removes the angular dispersion imparted by the first, the spatially separate, wavelength-differentiated optical beams will be parallel or nearly parallel to one another.

Each of the examples of FIGS. 1-10 is shown and described operating either (i) as a demultiplexer, in which a single input beam comprising two or more incoming, wavelength-differentiated optical signals is separated into multiple output beams, each of which corresponds to one of the outgoing, wavelength-differentiated optical signals, or (ii) as a multiplexer, in which two or more separate input beams, each of which corresponds to one of multiple, incoming, wavelength-differentiated optical signals, are combined into a single output beam. However, any disclosed demultiplexer can function as a multiplexer, and any disclosed multiplexer can function as a demultiplexer, by reversing the propagation directions of the various beams and by interchanging the source(s) and receiver(s) of the incoming and outgoing beams, respectively. The present disclosure shall encompass both uses of any disclosed example, i.e., as a multiplexer or demultiplexer.

A wavelength-differentiated optical signal or beam may be referred to herein using a single nominal wavelength (e.g., 880 nm or 940 nm) or as a single-wavelength beam, but it should be understood that each optical signal comprises some non-zero bandwidth around a nominal wavelength or within a defined wavelength channel in a telecommunications system of interest.

Figure 1:
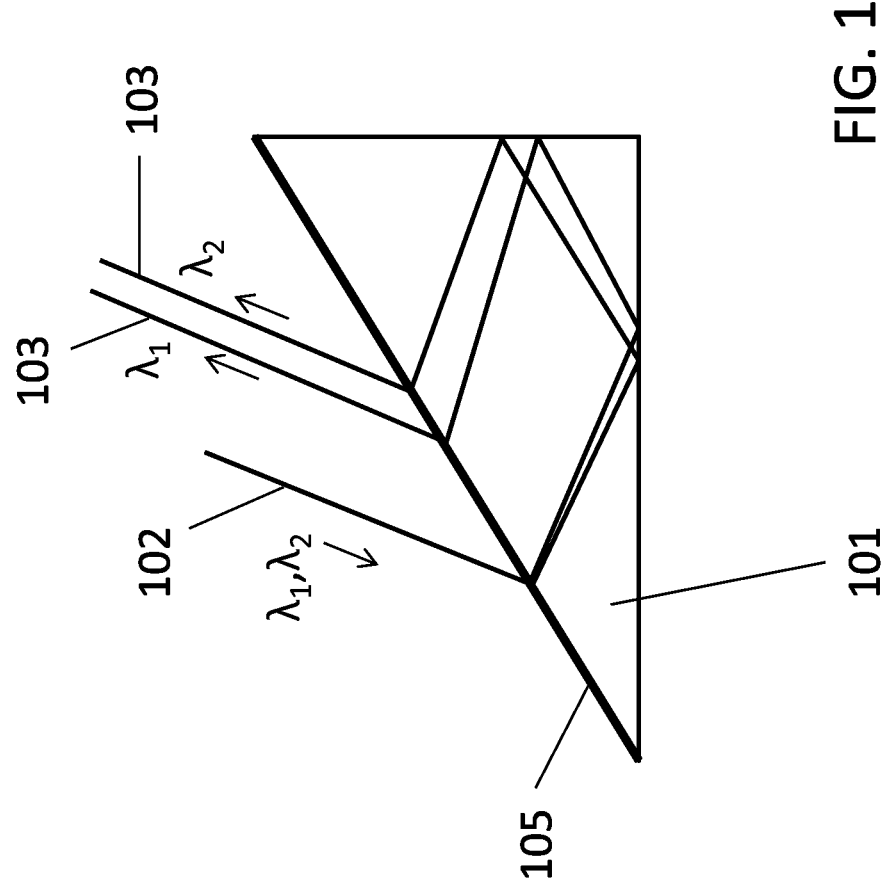
FIGS. 1 through 10 illustrate schematically various example embodiments of an optical multiplexer or demultiplexer based on diffraction and reflection.

The example of FIG. 1 comprises a prism 101 immersed in an ambient medium and acting as an optical spacer; both the prism and ambient medium are substantially transparent over a desired operational wavelength range, i.e., sufficiently transparent at operative signal wavelengths so that necessary or desired optical power levels are maintained. The prism 101 can comprise a solid material immersed in a gaseous, liquid, or solid ambient medium, or the prism can comprise a gaseous or liquid material (or vacuum) filling a prism-shaped void in a solid ambient medium; alternatively, the "prism" can comprise a set of diffraction grating(s) and reflector(s) held in place mechanically (e.g., by mounting them in slots, frames, or other fixtures or mounts) within a gaseous or liquid medium that forms either or both the interior of the "prism" and the ambient medium. A transmissive diffractive optical element 105 is located at an interface between prism 101 and the ambient medium and comprises a set of multiple diffractive elements arranged in any suitable way (e.g., a diffraction grating). The diffractive elements can comprise grooves, ridges, index modulations, or any other suitable structure; the diffractive elements can be arranged within the grating 105, e.g., as uniformly spaced straight lines, variably spaced straight lines, or general curvilinear lines with uniform or variable spacing. The grating can be arranged to provide wavefront transformation of a diffracted optical signal, e.g., the grating can accept diverging beams and collimate them or vice versa, can accept a diverging incoming beam and produce a converging outgoing beam or vice versa, or can at least partly compensate or correct for wavefront aberrations introduced by other optical elements in the apparatus. More general wavefront transformations can be implemented as disclosed, e.g., in U.S. Pat. Nos. 7,349,599; 7,519,248; 7,676,128; 7,840,106; and 8,068,709, each of which is incorporated by reference. Using lithographic patterning methods, the grating 105 can have separately designed diffractive properties at differing locations of each beam passing through it.

The diffraction grating 105 can be formed directly in a material interface between the prism 101 and the ambient medium. In some examples, grooves or trenches are etched into the surface of, e.g., silica, glass, other crystalline or amorphous dielectric, silicon, or other semiconductor. In other examples, grooves or trenches can be molded or stamped into a plastic or polymer material. Alternatively, the diffraction grating 105 can be formed separately on a substrate (in any suitable way on any suitable substrate material, including those ways and materials mentioned above) which is then attached to the material interface between the prism 101 and the ambient medium.

The example of FIG. 1 is arranged as a demultiplexer and the transmission grating 105 has equally spaced straight lines. A multiplexed input optical signal propagating along a multiplexed beam path 102 toward a multiplexed transmission region of the grating 105 includes in this example two wavelength-differentiated optical signals at wavelengths $\lambda_1$ and $\lambda_2$. The multiplexed transmission region is the region of the grating 105 where the multiplexed beam path 102 intersects the grating 105. The multiplexed optical signal generally can include multiple co-propagating modulated optical signals of different selected carrier wavelengths within an operational wavelength range (e.g., about 800-900 nm or about 1200-1700 nm for typical telecommunications use; other suitable operational wavelength ranges can be employed), each one carrying a corresponding telecommunications signal (e.g., voice, data, or other). A multiplexed output optical signal would propagate away from the multiplexed transmission region of the grating 105 if this example were operated as a multiplexer.

The wavelength-differentiated optical signals are transmissively, dispersively diffracted and angularly dispersed by grating 105, reflected twice from the surfaces of the prism 101, and transmissively, dispersively diffracted a second time by grating 105. Diffraction angles and dispersion can be calculated in the usual way using the grating equation (see below). Demultiplexed output optical signals at the different wavelengths $\lambda_1$ and $\lambda_2$ propagate along corresponding demultiplexed beam paths 103 and can be directed to separate corresponding photodetectors, optical fibers, optical waveguides, or other optical elements as needed or desired for the effective utilization of the demultiplexed, single-wavelength signals. The demultiplexed transmission regions are those regions of the grating 105 where the demultiplexed beam paths 103 intersect the grating 105. The prism 101 in the example of FIG. 1 is a right angle prism with the grating 105 positioned on its hypotenuse. With that arrangement, the multiplexed beam path 102 and demultiplexed beam paths 103 are substantially parallel (to within the tolerance of the right angle of the prism 101) with the demultiplexed signals propagating along demultiplexed beam paths 103 in the opposite direction of the multiplexed optical signals propagating along multiplexed beam path 102. Deviation from a right-angled prism results in corresponding non-parallelism of the demultiplexed beam paths 103, which can be useful in some applications.

Transmissive, dispersive diffraction occurs according to the grating equation and the grating-normal vector direction, grating wavevector magnitude, and grating wavevector direction that characterize the multiplexed and demultiplexed transmission regions of the diffraction grating 105 (or other one or more diffractive optical elements in other examples or embodiments). The grating equation is $n_A \sin \theta_{in} + n_S \sin \theta_{d,m} = m\lambda/\Lambda$, where m designates the diffracted order (zero, ±1, ±2, and so on), $\theta_{in}$ is the incidence angle (relative to the grating-normal vector), $\theta_{d,m}$ is the diffracted angle (relative to the grating-normal vector) for the mth diffracted order, and $n_A$ and $n_S$ are the refractive indices of ambient and substrate media, respectively. Simple, non-dispersive transmission (i.e., refraction) satisfies the grating equation for m=0 (zeroth order); non-zero-order diffracted orders are those that satisfy the grating equation for m≠0 and result in dispersive diffraction, so that the angle at which each individual optical signal is diffracted depends on its corresponding wavelength. Transmissive diffraction gratings employed in multiplexers or demultiplexers disclosed or claimed herein can be realized, e.g., as grooves or ridges, as periodic or quasi-periodic index modulations, employing a single material or multiple materials (such as disclosed in U.S. Pat. No. 8,165,436, which is incorporated by reference as if fully set forth herein), or in any other suitable way.

The multiple demultiplexed transmission regions can comprise spatially distinct regions of a single diffraction grating, or can be distributed among multiple diffraction gratings. In some embodiments the demultiplexed transmission regions can be characterized by the same wavevector magnitude and direction; in other embodiments they can differ with respect to one or both of those grating parameters. In embodiments wherein the grating parameters differ among the demultiplexed transmission regions, those regions can comprise regions of distinct gratings, or distinct areas of a single grating having spatially varying grating parameters. For example, a single grating can be employed that has a grating line spacing (i.e., grating wavevector magnitude) that varies across the single grating; that variation of grating line spacing can take the form of (i) distinct areas of the single diffractive optical element each exhibiting a substantially uniform grating line spacing that differs from the other distinct areas thereof, (ii) a single, contiguous diffractive optical element over which the grating line spacing smoothly varies (e.g., a linearly chirped diffraction grating), or (iii) other suitable spatial variation of grating wavevector magnitude or direction.

Any sufficiently efficient reflectivity can be employed at the surfaces of the prism 101 for reflecting the dispersed beams. Depending on the refractive indices and incidence angles, simple Fresnel reflection or total internal reflection can be employed in some instances. More typically, a suitable reflective coating (e.g., metal, multilayer, or other) can be employed at prism surfaces where the beams are to be reflected.

Figure 2:
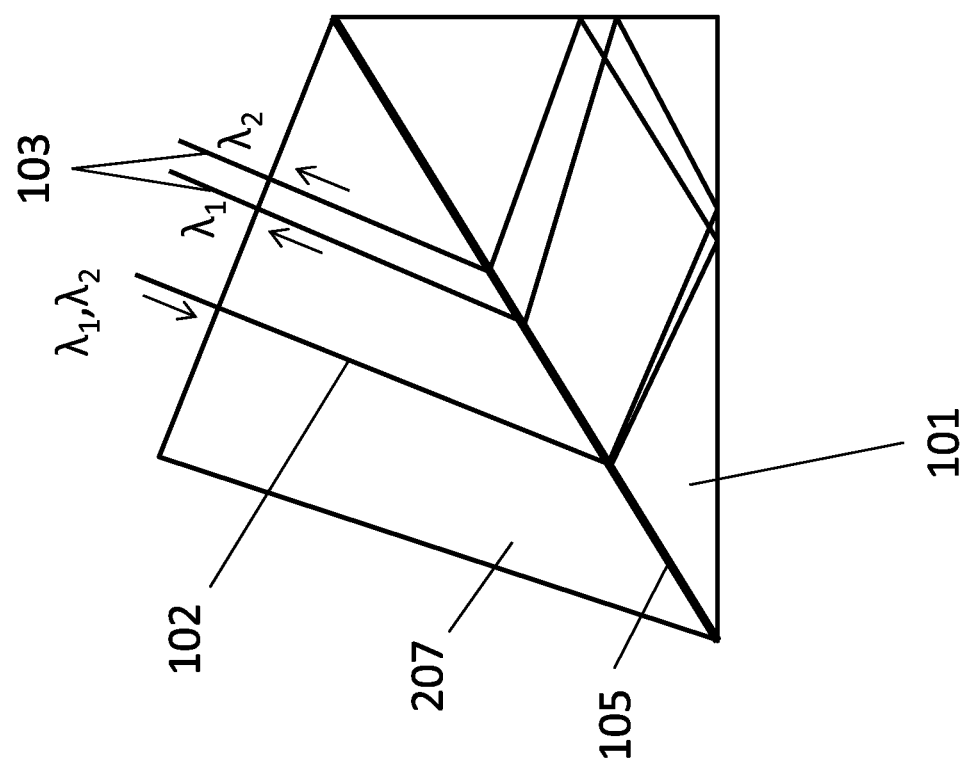

The example device of FIG. 2 is similar to that of FIG. 1 except that a second prism 207 has been added. The prism 207 can be cemented to the grating 105 (if the grating 105 is designed specifically for operation when cemented) or an air space can be left between the grating 105 and the prism surface. Addition of the second prism 207 can provide, e.g., a convenient, near normal mounting plane for input or output optical fibers, photodetectors, or optical sources.

Figure 3:
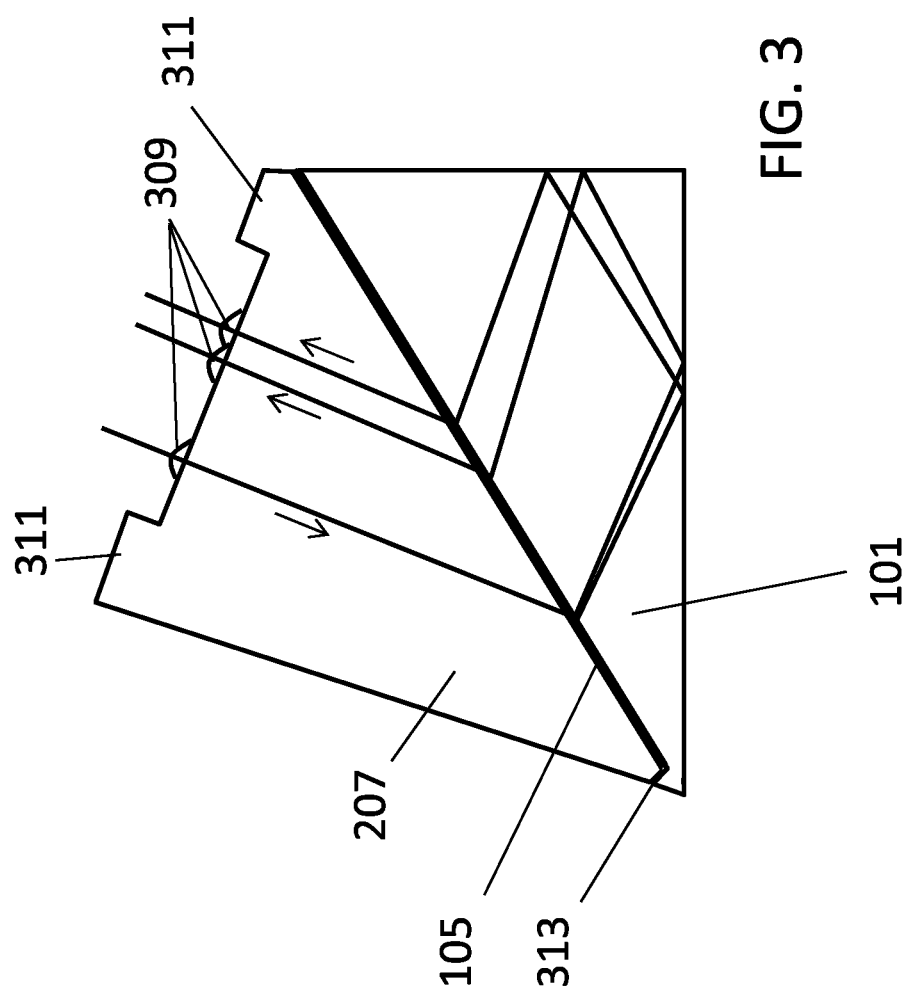
Figure 4:
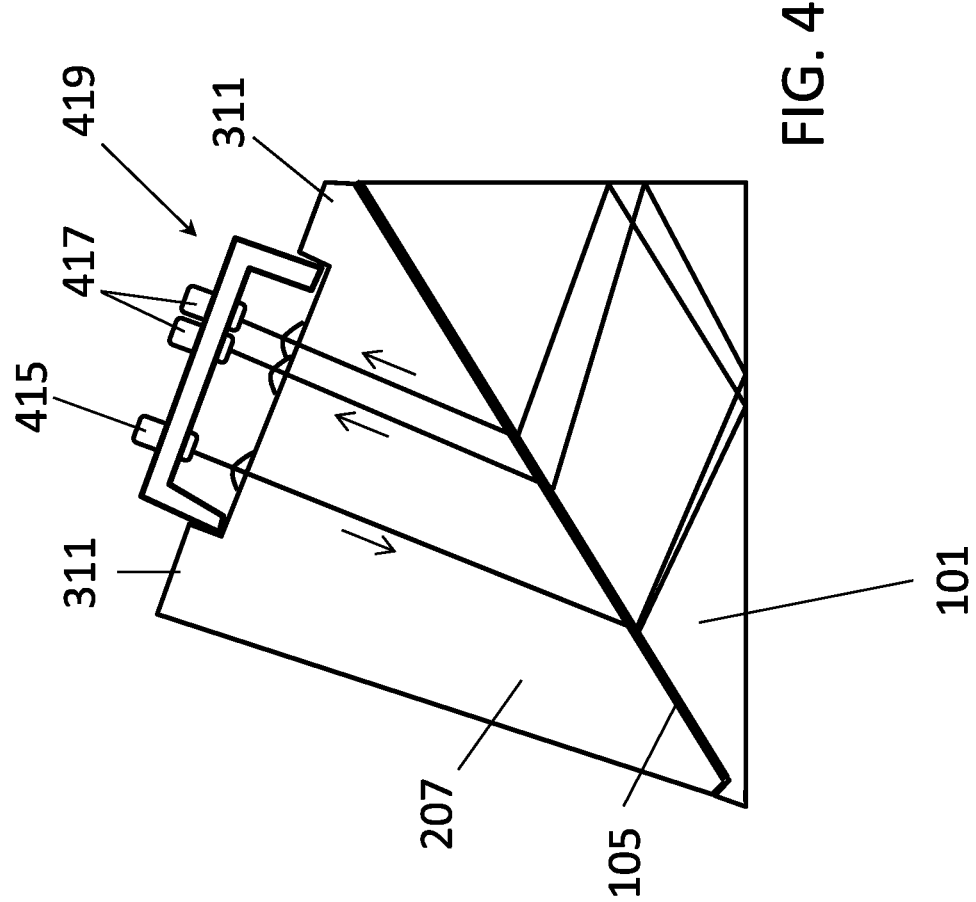

In the example of FIG. 3, an alignment ridge 313 is formed on the prism 101 to accurately position an alignment edge of the second prism 207. In addition, the second prism 207 is modified to include alignment ridges 313 and lenses 309 (e.g., lenslets 309 or other suitable focusing optical element). The lenslets 309 can focus or collimate incoming or outgoing light beams (depending on whether the device is operated as a multiplexer or demultiplexer, and on whether the input beam(s) is/are collimated or diverging). The alignment ridges 311 can be used to provide a seating location for, e.g., optical sources, photodetectors, or optical fibers. The example of FIG. 4 includes an optical fiber source 415 and photodetectors 417 mounted on an assembly 419, which is in turn seated on the prism 207 and positioned with the help of the ridges 311.

In each of the preceding and succeeding example devices, the prism 101 or 207 (or both) can be constructed from glass-type materials or, in low-cost applications, the prisms can be plastic and can be formed by injection molding or other typical plastic-forming techniques. In each of the preceding and succeeding example devices, the diffraction gratings(s) can be, e.g.: fabricated in wafer form, diced, and attached to the prism(s); fabricated in any other suitable way and attached to the prism(s); or the grating(s) can be formed directly in the prism surfaces via etching, molding, stamping, or other suitable techniques.

Figure 5:
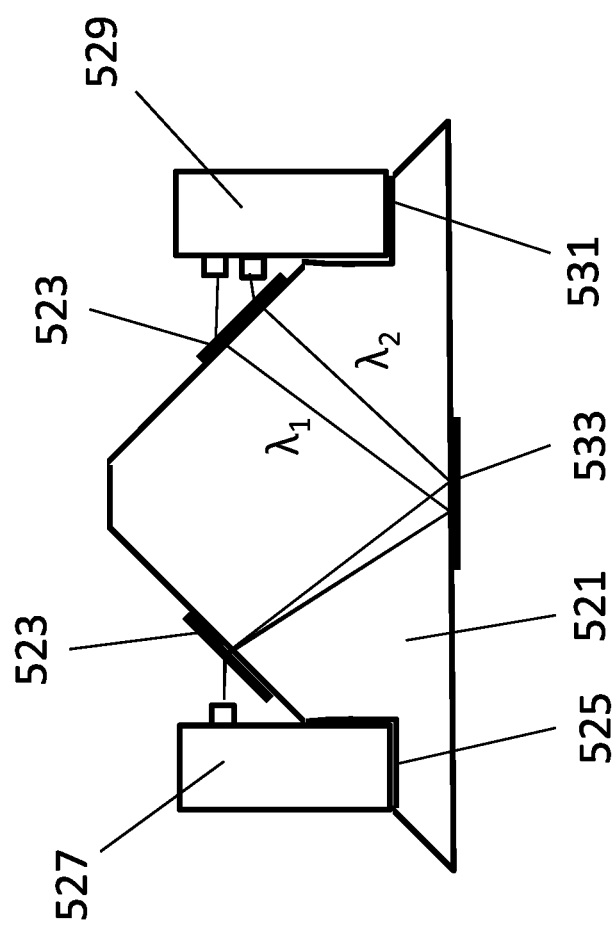

A different type of example device is shown in FIG. 5. In this example, two transmissive diffraction gratings 523 are mounted or formed on two right-angled surfaces of an isosceles right-angled prism 521 (the top corner of the prism is truncated for compactness, but the surfaces bearing the gratings 523 are substantially orthogonal to each other). A reflector 533 is mounted or formed on the hypotenuse of the right-angled prism 521. If needed or desired, the overall width of the prism 521 can be reduced so as to also reduce the angle of incidence on the mirror 533, thereby reducing the polarization dependence of its reflectivity. In the example of FIG. 5, a multi-wavelength optical source 527 (e.g., the end of an optical fiber) launches an input beam comprising two wavelength-differentiated optical signals through the left-side grating 523. Upon diffraction by that grating, the beams propagate through the prism 521 via reflection from the mirror 533 to be diffracted by the right-side grating 523. The spatially dispersed output beams are received by receiver 529 (e.g., a pair of photodetectors). Source 527 and receiver 529 are mounted on surfaces 525 and 531, respectively, that are formed in the prism 521 for that purpose.

In the example shown in FIG. 5, the right-angled prism is an isosceles prism, the gratings 523 and substantially identical, and the multiplexed and demultiplexed beam paths are substantially parallel to the reflector 533. More generally (for the example of FIGS. 5-10): (i) the prism 521 or other optical spacer need not be arranged as a right-angle prism; any desired or suitable angle between the gratings 523 can be employed: (ii) the prism 521 or other optical spacer need not be arranged as an isosceles prism; angles between the gratings 523 and the reflector 533 can differ from one another to any desired or suitable degree; or (iii) the gratings 523 need not be substantially identical, but can differ with respect to grating wavevector magnitude, direction, or spatial variation in any desired or suitable way.

Figure 6:
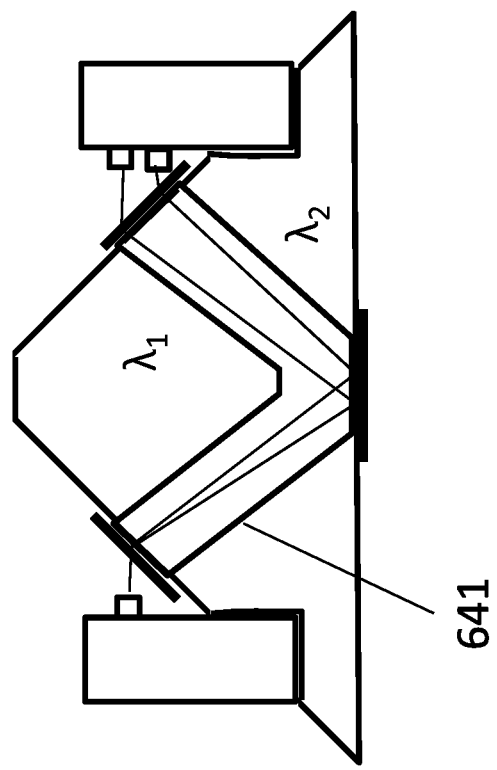

The example of FIG. 6 is similar to that of FIG. 5 except that the prism has been modified to have a passage 641 for passing the optical beams as they propagate from one grating to the other grating via the mirror. In some cases such a passage filled with a lower-index medium (or vacuum) allows for larger angular dispersion (compared to a higher-index medium) and hence more output beam separation for a fixed grating-to-grating distance. The passage 641 can be substantially evacuated, or can be filled with air, inert gas, or other suitable gaseous or liquid medium that is substantially transparent over the operational wavelength range.

Figure 7:
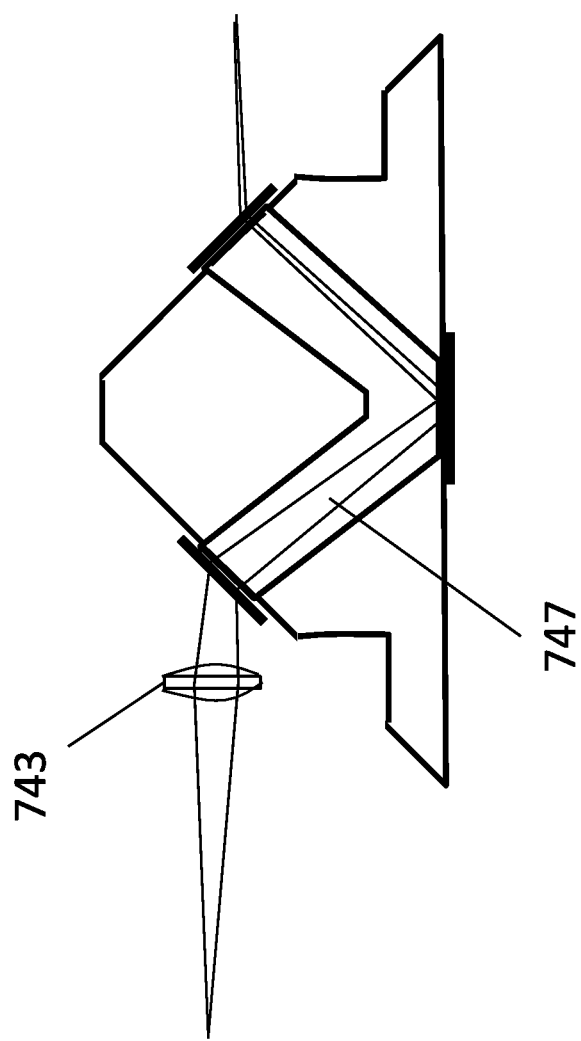

In the example of FIG. 7 (similar to that of FIG. 6), the light beam shows the multiplexer/demultiplexer of FIG. 6 configured to operate on a light beam 747 that converges as it passes through the gratings. The passage of the converging beam through the grating pair can introduce some focal distortions or aberrations. If needed or desired, the input lens 743 can be designed as part of the multiplexer/demultiplexer system with surface profiles designed to reduce or minimize overall distortions or aberrations. Alternatively, one or both grating surfaces can be configured with position dependent line spacing and line curvature so as to compensate for wavefront distortion introduced as a converging beam passes through the grating pair, or to provide for focusing instead of lens 743 (e.g., according to the teachings of U.S. Pat. Nos. 7,349,599; 7,519,248; 7,676,128; 7,840,106; and 8,068,709, incorporated above). Additional wavelength-differentiated beams (not shown in FIG. 7) pass through the grating pair similarly and emerge laterally displaced but nearly parallel on the right side. Although shown in an example that includes propagation of optical signals through a passage, an arrangement including the lens 743 can also be employed in examples including propagating through a prism or other medium.

Figure 8:
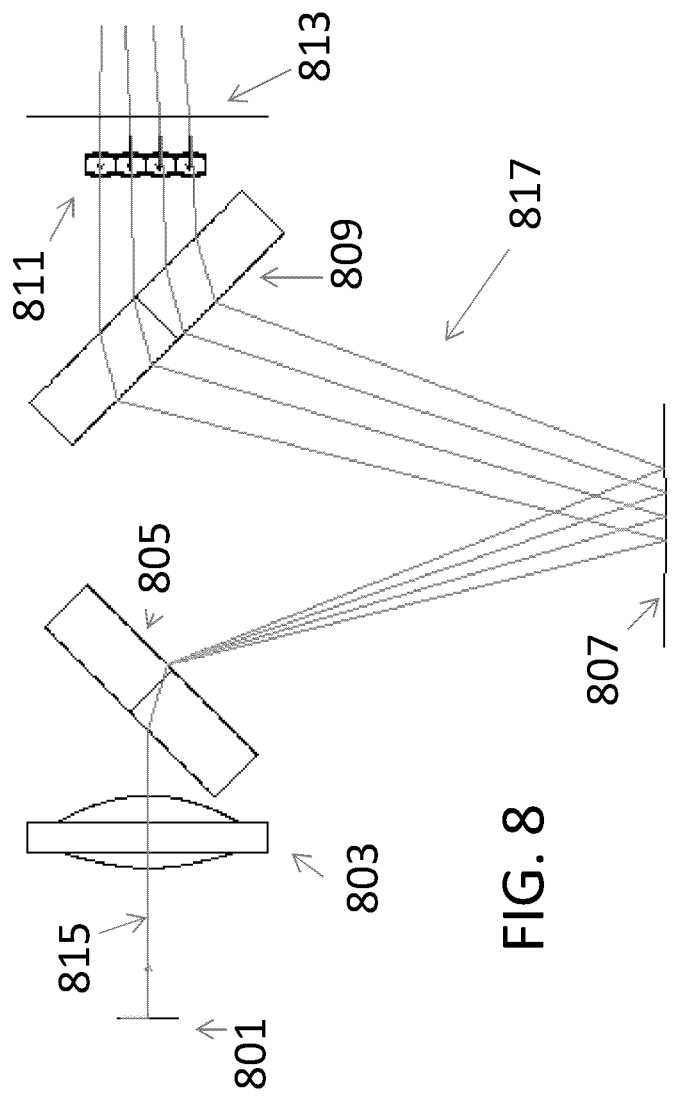

A similar example of a spectral-spatial displacer functioning as a demultiplexer is shown in FIG. 8. A single input beam 815 emerges from a fiber input port 801 and enters the device along the multiplexed beam path; in this example the input beam 815 comprises four wavelength-differentiated signals at, e.g., 850, 880, 910 and 940 nm. The input beam 815 is launched from the optical fiber port 801 (e.g., from single-mode optical fiber) and diverges until it reaches lens 803. The lens 803 is arranged to focus the beam to converge to a minimum spot size after the second grating 809. The wavelength-differentiated beams 817 are shown schematically as simple lines in FIG. 8; the divergence and convergence of the beams 817 are not explicitly depicted. A first transmissive diffraction grating 805 is mounted or formed on a transmissive substrate (on the second surface in this example; it could be positioned on either surface) and is arranged to diffract each of the four input wavelengths into corresponding beams 817 propagating in different corresponding directions (i.e., angularly dispersed). In this example the diffraction grating 805 has parallel straight grating lines uniformly spaced at 1300 lines/mm; a wide range of line spacings may be chosen depending on the desired device geometry desired and wavelengths employed. Reflector 807 comprises a mirror with a small cylindrical curvature in this example (axis of cylinder perpendicular to the Figure). The curvature of mirror 807 can function to at least partially correct distortions of the converging beams passing through the pair of diffraction gratings 805 and 809, or can function to direct propagation of optical signals between the multiplexed transmission region and the demultiplexed transmission regions. Any suitable curvature of mirror 807 can be employed, including but not limited to spherical, cylindrical, ellipsoidal, or more generally aspheric.

Diffraction grating 809 is substantially identical to grating 805 in this example and is mounted or formed on a transmissive substrate (on the first surface in this example; it could be positioned on either surface) and is arranged to diffract each of the four angularly dispersed beams 817 to propagate (along corresponding demultiplexed beam paths) nearly parallel to one another. In this example, diffraction gratings 805 and 809 are both oriented at about 45° relative to the direction of the input beam 815 and mirror 807 is substantially parallel to that direction (i.e., the gratings 805 and 809 and the mirror 807 are arranged to resemble an isosceles right-angle prism); the gratings 805 and 809 and the mirror 807 are arranged relative to the input beam 815 to have substantially parallel planes of incidence. As a result of that arrangement, after being diffracted by grating 809, the four spatially separated, wavelength-differentiated output beams 817 propagate substantially parallel to one another and to input beam 815. The relative positions or directions of the wavelength-differentiated, spatially separated output beams 817 after the grating 809 can be adjusted by translation of the cylindrical mirror 807 in a direction parallel to the input beam 815, or by changing the cylindrical radius of the mirror 817. If mirror 807 is a planar mirror, the output beams 817 shown in FIG. 8 emerge from grating 809 substantially parallel but with a small non-uniformity of wavelength-dependent lateral spacing. A cylindrical mirror 807 can be employed to provide more uniform wavelength-dependent lateral displacement of the output beams 817 at, e.g., a lenslet array 811 or at a detector plane 813. Conventional ray tracing design software (e.g., such as Zemax®) can be employed to position mirror 807 optimally or to choose its optimal curvature (cylindrical or otherwise). The exact position of the minimum beam spot size formed by lens 803 typically is not critical provided that the output beams 817 can pass through corresponding individual lenses of the collection lenslet array 811 and be directed onto detectors located along the detector plane 813. The lenses of array 811 can be of any suitable type, e.g., refractive, diffractive, or gradient-index.

Figure 9:
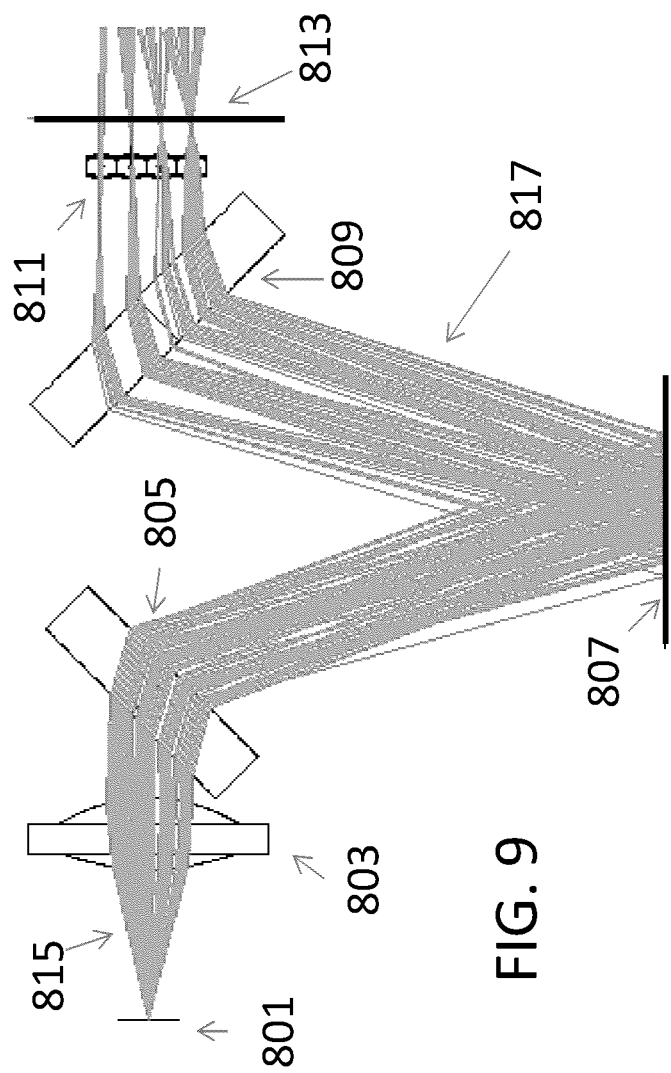

FIG. 9 is similar to FIG. 8 except that the input beam 815 is shown as a divergent ray bundle characteristic of output from some multimode optical fibers. The focusing action of lens 803 in this example serves to allow the laterally dispersed output beams to pass through corresponding individual lenses of the lenslet array 811. Because the wavelength-differentiated output beams are very nearly parallel after grating 809, if they pass through equally spaced lenslets 811 then the focused spots on the detector plane 813 are nearly equally spaced as well, even if the output beams entering the lenslets are not equally spaced.

Figure 10:
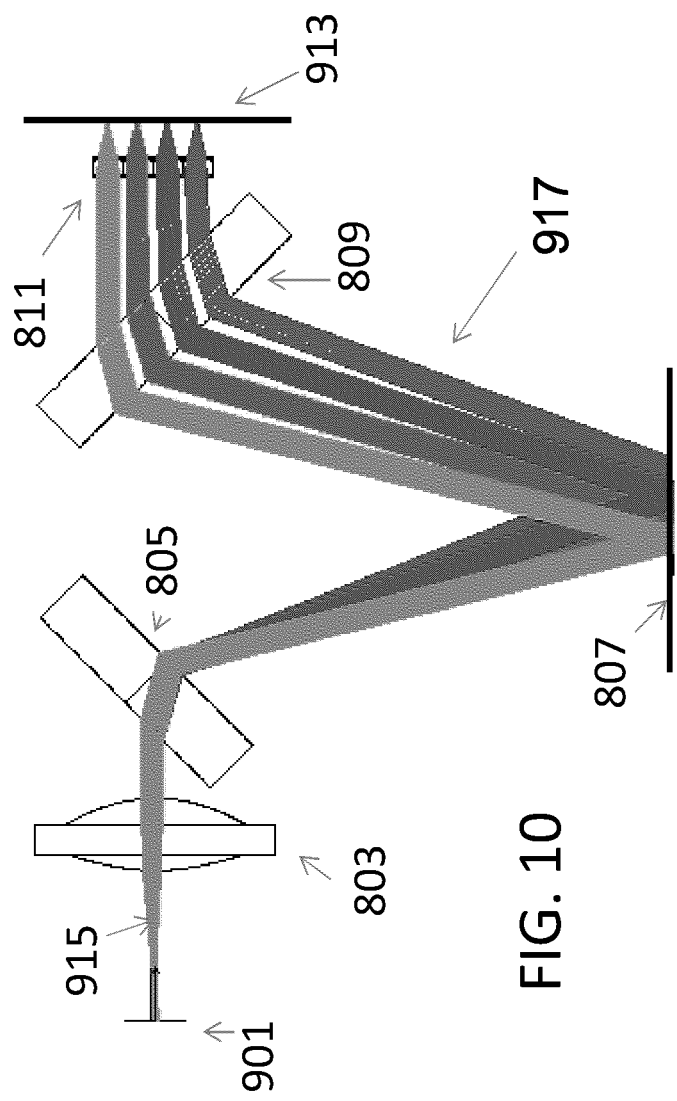

FIG. 10 shows an arrangement similar to that of FIGS. 8 and 9, but used as a multiplexer rather than as a demultiplexer. On plane 913 are positioned light sources at the respective wavelengths mentioned above; the light sources can comprise, e.g., laser diodes such as VCSELs, coupled directly or via corresponding optical waveguides, optical fibers, or other optical elements or transmission media. The lenslet array 811 (of any suitable type) can be arranged to approximately collimate the emitted optical beams propagating in reverse along the same demultiplexed beam paths as the separated beams in the demultiplexer example. Wavelength-differentiated beams 917 from the multiple light sources pass through diffraction grating 809, reflect from the mirror 807, and converge on diffraction grating 805. After passing through grating 805, the four wavelength-differentiated beams are superimposed and close to parallel, thereby forming the multi-wavelength beam 915 propagating along or substantially parallel to the multiplexed beam path. Lens 803 focuses the multi-wavelength beam 915 onto the face of the output optical fiber 901. The multiplexer arrangement of FIG. 10 is tolerant of lateral placement errors of the optical sources. Lateral source placement errors relative to the lenslet array 811 lead to lateral displacements of the corresponding constituent single-wavelength beams of the beam 915 on the lens 803 (relative to the multiplexed beam path). In the case of multimode fibers, source misplacement will only result in reduced output coupling when the source-placement-induced beam displacement on lens 803 causes the beam to encounter the output fiber face beyond the acceptance numerical aperture. The focal length of lens 803 can be increased to further reduce sensitivity to misplacement-induced angular decoupling between the source beams 917 and the output fiber 901.

For ease of manufacturing, diffraction gratings 805 and 809 along with mirror 807 can be mounted on a single shaped support structure with features facilitating grating or mirror placement. Alternatively, as in previous examples, the gratings and mirror can be formed or mounted on respective surfaces of a single volume of transparent material.

In another implementation of the invention, the lens 803 can be eliminated entirely and its focusing function implemented in grating 805 or in both gratings 805 and 809 (e.g., according to the teachings of U.S. Pat. Nos. 7,349,599; 7,519,248; 7,676,128; 7,840,106; and 8,068,709, incorporated above). Similarly, the lenslet array 811 can be eliminated with incorporation of its function in the wavefront transformation properties of one or both of the gratings 805 or 809. The gratings can be designed as known in the art as flat, focusing surface gratings and implemented with standard semiconductor tools on discrete components (e.g., as shown in FIGS. 8-10), as replications of lithographically or otherwise implemented gratings, or as direct imprints onto a single monolithic optical element (e.g., as in FIGS. 1-5). In the latter case, the entire spectral-displacement element can comprise a single substrate with both gratings 805 and 809 imprinted or otherwise formed on corresponding surfaces and mirror 807 formed on an appropriate surface of the element. As noted above and taught in the incorporated patents, flat, focusing grating structures can be designed as numerically simulated holograms with very general wavefront transformation capability. The diffraction gratings may also comprise volume gratings having diffraction bandwidths sufficiently broad to encompass the wavelengths of interest. Although the examples shown employ transmissive diffraction gratings, embodiments incorporating reflective gratings, or both transmissive and reflective gratings, and laid out accordingly to accommodate the corresponding reflective diffraction geometry, shall also fall within the scope of the present disclosure.

In various of the disclosed examples, optical signals at evenly spaced wavelengths do not necessarily result in demultiplexed beam paths that are evenly spaced laterally (due to the non-linearity of the grating equation). However, it can be desirable to employ a substantially linear array of evenly spaced light sources (for a multiplexer) or receivers (for a demultiplexer). The various arrangements disclosed herein can be suitably arranged to enable use of evenly spaced optical sources or receivers for multiplexing or demultiplexing optical signals at evenly spaced wavelengths. In particular, an arrangement can be employed that results in, e.g., (i) substantially parallel, substantially evenly spaced demultiplexed beam paths, (ii) substantially parallel, but not evenly spaced, demultiplexed beam paths that are nevertheless coupled or directed to/from evenly spaced receivers/sources, or (iii) optical signals propagating substantially parallel to, but displaced from, the multiplexed beam path that are nevertheless coupled or directed to an optical waveguide or fiber.

In addition to the preceding, the following examples fall within the scope of the present disclosure or appended claims:

Example 1

An optical apparatus comprising one or more transmissive diffractive optical elements, one or more reflective optical elements, and a set of multiple optical sources or receivers, wherein: the one or more diffractive optical elements, the one or more reflective optical elements, and the set of multiple optical sources or receivers are held in substantially fixed positions relative to one another; the one or more diffractive optical elements include (i) a multiplexed transmission region characterized by a corresponding average grating-normal vector direction, a corresponding average grating wavevector magnitude, and a corresponding average grating wavevector direction, and (ii) multiple demultiplexed transmission regions that are spatially displaced from one another, each of which is characterized by a corresponding average grating-normal vector direction, a corresponding average grating wavevector magnitude, and a corresponding average grating wavevector direction; each one of the one or more reflective optical elements is characterized by a corresponding average reflector-normal vector direction and a corresponding reflector surface shape; the relative positions of the one or more diffractive optical elements, one or more reflective optical elements, and set of multiple optical sources or receivers, the grating-normal vector directions, the grating wavevector magnitudes, the grating wavevector directions, the reflector-normal vector directions, and the reflector surface shapes are such that each one of a set of multiple optical signals, at corresponding different selected signal wavelengths in an operational wavelength range, co-propagating to the multiplexed transmission region along a multiplexed beam path would (i) be transmissively, dispersively diffracted at the multiplexed transmission region, (ii) propagate between the multiplexed transmission region and a corresponding demultiplexed transmission region undergoing at least one reflection from at least one of the one or more reflective optical elements, (iii) be transmissively, dispersively diffracted at the corresponding demultiplexed transmission region, and (iv) propagate between the corresponding demultiplexed transmission region and a corresponding one of the set of multiple optical sources or receivers along a corresponding one of multiple demultiplexed beam paths.

Example 2

The optical apparatus of Example 1 wherein an optical signal propagating between the multiplexed transmission region and one of the demultiplexed transmission regions undergoes only a single reflection.

Example 3

The optical apparatus of Example 1 wherein an optical signal propagating between the multiplexed transmission region and one of the demultiplexed transmission regions undergoes multiple reflections.

Example 4

The optical apparatus of any one of Examples 1 through 3 wherein the set of multiple optical sources or receivers comprises a set of multiple photodetectors sensitive to optical signals in the operational wavelength range, wherein each photodetector is positioned so as to receive an optical signal in the operational wavelength range propagating from a corresponding demultiplexed transmission region along the corresponding demultiplexed beam path.

Example 5

The optical apparatus of any one of Examples 1 through 3 wherein the set of multiple optical sources or receivers comprises a set of multiple optical fibers or optical waveguides positioned so as to receive corresponding optical signals in the operational wavelength range propagating from the corresponding demultiplexed transmission regions along the corresponding demultiplexed beam paths.

Example 6

The optical apparatus of any one of Examples 1 through 3 wherein the set of multiple optical sources or receivers comprises a set of multiple light sources emitting corresponding optical signals at corresponding wavelengths in the operational wavelength range, wherein each light source is positioned so as to launch the corresponding optical signal to propagate from the light source along a corresponding demultiplexed beam path to the corresponding demultiplexed transmission region.

Example 7

The optical apparatus of any preceding Example wherein the set of multiple optical sources or receivers comprises a substantially linear array of three or more substantially evenly spaced optical sources or receivers.

Example 8

The optical apparatus of any preceding Example further comprising a set of multiple focusing optical elements, wherein each focusing optical element is positioned to be intersected by a corresponding one of the demultiplexed beam paths and is structurally arranged so as (i) to provide a corresponding wavefront transformation to an optical signal diffracted by the demultiplexed transmission region or (ii) to direct the corresponding demultiplexed beam path between the corresponding demultiplexed transmission region and the corresponding optical source or receiver.

Example 9

The optical apparatus of any preceding Example further comprising a focusing optical element positioned to be intersected by the multiplexed beam path and structurally arranged so as (i) to provide a wavefront transformation to an optical signal diffracted by the multiplexed transmission region or (ii) to direct the multiplexed beam path between the multiplexed transmission region and an optical fiber or an optical waveguide.

Example 10

The optical apparatus of any preceding Example wherein at least one of the demultiplexed transmission regions is structurally arranged so as to act as a focusing optical element (i) to provide a corresponding wavefront transformation to an optical signal diffracted by the demultiplexed transmission region or (ii) to direct the corresponding demultiplexed beam path between the corresponding demultiplexed transmission region and the corresponding optical source or receiver.

Example 11

The optical apparatus of any preceding Example wherein the multiplexed transmission region is structurally arranged so as to act as a focusing optical element (i) to provide a wavefront transformation to an optical signal diffracted by the multiplexed transmission region or (ii) to direct the multiplexed beam path between the multiplexed transmission region and an optical fiber or waveguide.

Example 12

The optical apparatus of any preceding Example wherein at least one of the reflective optical elements is structurally arranged to act as a focusing optical element (i) to provide a wavefront transformation to an optical signal propagating between the multiplexed transmission region and one of the demultiplexed transmission regions or (ii) to direct propagation of the optical signal between the multiplexed transmission region and the corresponding demultiplexed transmission region.

Example 13

The optical apparatus of any preceding Example further comprising an optical spacer structurally arranged to hold the one or more diffractive optical elements and the one or more reflective optical elements in the substantially fixed positions.

Example 14

The optical apparatus of Example 13 wherein: the optical spacer includes a volume of substantially rigid solid material substantially transparent over the operational wavelength range; the one or more diffractive optical elements are positioned on or within the solid material; the one or more reflective optical elements are positioned on the solid material; and an optical signal propagating between the multiplexed transmission region and one of the demultiplexed transmission regions propagates within the solid material and undergoes one or more internal reflections within the solid material from at least one of the one or more reflective optical elements.

Example 15

The optical apparatus of Example 14 wherein the solid material comprises one or more of a glass, silica, doped silica, a polymer or resin, a dielectric material, or a semiconductor material.

Example 16

The optical apparatus of any one of Examples 14 or 15 wherein the one or more diffractive optical elements comprise one or more diffraction gratings formed on one or more corresponding grating substrates attached to a surface of the solid material.

Example 17

The optical apparatus of any one of Examples 14 or 15 wherein the one or more diffractive optical elements comprise one or more diffraction gratings formed on a surface of the solid material.

Example 18

The optical apparatus of any one of Examples 14 through 17 wherein at least one of the one or more diffractive optical elements is positioned between adjacent portions of the solid material, and portions of the multiplexed or demultiplexed beam paths lie within the solid material.

Example 19

The optical apparatus of any one of Examples 14 through 18 wherein at least one of the one or more reflective optical elements comprises one or more reflective coatings formed on a surface of the solid material.

Example 20

The optical apparatus of any one of Examples 14 through 19 wherein at least one of the one or more reflective optical elements comprises an uncoated surface of the solid material at which an optical signal propagating between the multiplexed transmission region and one of the demultiplexed transmission regions undergoes partial or total internal reflection.

Example 21

The optical apparatus of Example 13 wherein: the optical spacer includes a contiguous enclosed volume; the enclosed volume is substantially evacuated or contains a gaseous or liquid material substantially transparent over the operational wavelength range; each one of the one or more diffractive elements and each one of the one or more reflective optical elements forms a corresponding portion of a boundary surface of the enclosed volume; and an optical signal propagating between the multiplexed transmission region and one of the demultiplexed transmission regions propagates within the enclosed volume.

Example 22

The optical apparatus of any one of Examples 13 through 21 wherein the optical spacer is further structurally arranged to hold the one or more optical sources or receivers in the substantially fixed positions.

Example 23

The optical apparatus of any one of Examples 13 through 22 further comprising one or more focusing optical elements wherein: each one of the focusing optical elements is positioned to be intersected by a corresponding one of the multiplexed or demultiplexed beam paths; and the optical spacer is further structurally arranged to hold the one or more focusing optical elements in substantially fixed positions.

Example 24

The optical apparatus of any one of Examples 1 through 23 wherein the multiplexed transmission region differs from at least one of the demultiplexed transmission regions with respect to grating-normal direction.

Example 25

The optical apparatus of any one of Examples 1 through 23 wherein the grating-normal vector directions of the demultiplexed transmission regions are substantially parallel to the grating-normal vector direction of the multiplexed transmission region.

Example 26

The optical apparatus of Example 25 wherein the multiplexed transmission region and the demultiplexed transmission regions are substantially coplanar.

Example 27

The optical apparatus of any preceding Example wherein each demultiplexed transmission region differs from at least one other demultiplexed transmission region with respect to grating wavevector magnitude or direction.

Example 28

The optical apparatus of Example 27 wherein (i) the one or more diffractive optical elements include multiple distinct transmission diffraction gratings and (ii) two or more among the multiple distinct diffraction gratings include one or more of the demultiplexed transmission regions.

Example 29

The optical apparatus of Example 27 wherein the demultiplexed transmission regions comprise spatially distinct regions of a single transmission diffraction grating having spatially varying grating wavevector magnitude or direction.

Example 30

The optical apparatus of any preceding Example wherein the demultiplexed beam paths are substantially parallel to one another upon intersecting the corresponding demultiplexed transmission regions.

Example 31

The optical apparatus of Example 30 wherein substantially parallel portions of the demultiplexed beam paths are substantially evenly spaced apart.

Example 32

The optical apparatus any one of Example 30 or 31 wherein substantially parallel portions of the demultiplexed beam paths are substantially parallel to a portion of the multiplexed beam path that intersects the multiplexed transmission region.

Example 33

The optical apparatus of any preceding Example wherein the operation wavelength range is (i) about 800 nm to about 900 nm or (ii) about 1200 nm to about 1700 nm.

Example 34

A method for using the optical apparatus of any one of Examples 1 through 33 wherein the set of multiple optical sources or receivers comprises a set of multiple optical receivers, the method comprising: directing a multiplexed optical signal to propagate along the multiplexed beam path to the multiplexed transmission region, wherein the multiplexed optical signal comprises a corresponding optical signal at each of two or more different corresponding wavelengths in the operational wavelength range; and receiving each corresponding optical signal at the corresponding optical receiver, wherein each corresponding optical signal propagates from the corresponding demultiplexed transmission region along the corresponding demultiplexed beam path to the corresponding optical receiver.

Example 35

A method for using the optical apparatus of any one of Examples 1 through 33 wherein the set of multiple optical sources or receivers comprises a set of multiple optical sources, the method comprising emitting a corresponding optical signal from each of two or more of the optical sources at two or more different corresponding wavelengths in the operational wavelength range to propagate along the corresponding demultiplexed beam path to the corresponding demultiplexed transmission region, wherein the corresponding optical signals propagate from the multiplexed transmission region along or substantially parallel to the multiplexed beam path as a multiplexed optical signal.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise.

In the appended claims, if the provisions of 35 USC §112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An optical apparatus comprising one or more transmissive diffractive optical elements, one or more reflective optical elements, and a set of multiple optical sources or receivers, wherein:

the one or more diffractive optical elements, the one or more reflective optical elements, and the set of multiple optical sources or receivers are held in substantially fixed positions relative to one another;

the one or more diffractive optical elements include (i) a multiplexed transmission region characterized by a corresponding average grating-normal vector direction, a corresponding average grating wavevector magnitude, and a corresponding average grating wavevector direction, and (ii) multiple demultiplexed transmission regions that are spatially displaced from one another, each of which is characterized by a corresponding average grating-normal vector direction, a corresponding average grating wavevector magnitude, and a corresponding average grating wavevector direction;

each one of the one or more reflective optical elements is characterized by a corresponding average reflector-normal vector direction and a corresponding reflector surface shape;

the relative positions of the one or more diffractive optical elements, one or more reflective optical elements, and set of multiple optical sources or receivers, the grating-normal vector directions, the grating wavevector magnitudes, the grating wavevector directions, the reflector-normal vector directions, and the reflector surface shapes are such that each one of a set of multiple optical signals, at corresponding different selected signal wavelengths in an operational wavelength range, co-propagating to the multiplexed transmission region along a multiplexed beam path would (i) be transmissively, dispersively diffracted at the multiplexed transmission region, (ii) propagate between the multiplexed transmission region and a corresponding demultiplexed transmission region undergoing at least one reflection from at least one of the one or more reflective optical elements, (iii) be transmissively, dispersively diffracted at the corresponding demultiplexed transmission region, and (iv)

propagate between the corresponding demultiplexed transmission region and a corresponding one of the set of multiple optical sources or receivers along a corresponding one of multiple demultiplexed beam paths.

2. The optical apparatus of claim 1 wherein an optical signal propagating between the multiplexed transmission region and one of the demultiplexed transmission regions undergoes only a single reflection.

3. The optical apparatus of claim 1 wherein an optical signal propagating between the multiplexed transmission region and one of the demultiplexed transmission regions undergoes multiple reflections.

4. The optical apparatus of claim 1 wherein the set of multiple optical sources or receivers comprises a set of multiple photodetectors sensitive to optical signals in the operational wavelength range, wherein each photodetector is positioned so as to receive an optical signal in the operational wavelength range propagating from a corresponding demultiplexed transmission region along the corresponding demultiplexed beam path.

5. The optical apparatus of claim 1 wherein the set of multiple optical sources or receivers comprises a set of multiple optical fibers or optical waveguides positioned so as to receive corresponding optical signals in the operational wavelength range propagating from the corresponding demultiplexed transmission regions along the corresponding demultiplexed beam paths.

6. The optical apparatus of claim 1 wherein the set of multiple optical sources or receivers comprises a set of multiple light sources emitting corresponding optical signals at corresponding wavelengths in the operational wavelength range, wherein each light source is positioned so as to launch the corresponding optical signal to propagate from the light source along a corresponding demultiplexed beam path to the corresponding demultiplexed transmission region.

7. The optical apparatus of claim 1 wherein the set of multiple optical sources or receivers comprises a substantially linear array of three or more substantially evenly spaced optical sources or receivers.

8. The optical apparatus of claim 1 further comprising a set of multiple focusing optical elements, wherein each focusing optical element is positioned to be intersected by a corresponding one of the demultiplexed beam paths and is structurally arranged so as (i) to provide a corresponding wavefront transformation to an optical signal diffracted by the demultiplexed transmission region or (ii) to direct the corresponding demultiplexed beam path between the corresponding demultiplexed transmission region and the corresponding optical source or receiver.

9. The optical apparatus of claim 1 further comprising a focusing optical element positioned to be intersected by the multiplexed beam path and structurally arranged so as (i) to provide a wavefront transformation to an optical signal diffracted by the multiplexed transmission region or (ii) to direct the multiplexed beam path between the multiplexed transmission region and an optical fiber or an optical waveguide.

10. The optical apparatus of claim 1 wherein each demultiplexed transmission region is structurally arranged so as to act as a focusing optical element (i) to provide a corresponding wavefront transformation to an optical signal diffracted by the demultiplexed transmission region or (ii) to direct the corresponding demultiplexed beam path between the corresponding demultiplexed transmission region and the corresponding optical source or receiver.

11. The optical apparatus of claim 1 wherein the multiplexed transmission region is structurally arranged so as to act as a focusing optical element (i) to provide a wavefront transformation to an optical signal diffracted by the multiplexed transmission region or (ii) to direct the multiplexed beam path between the multiplexed transmission region and an optical fiber or waveguide.

12. The optical apparatus of claim 1 wherein at least one of the reflective optical elements is structurally arranged to act as a focusing optical element (i) to provide a wavefront transformation to an optical signal propagating between the multiplexed transmission region and one of the demultiplexed transmission regions or (ii) to direct propagation of the optical signal between the multiplexed transmission region and the corresponding demultiplexed transmission region.

13. The optical apparatus of claim 1 further comprising an optical spacer structurally arranged to hold the one or more diffractive optical elements and the one or more reflective optical elements in the substantially fixed positions.

14. The optical apparatus of claim 13 wherein:
the optical spacer includes a volume of substantially rigid solid material substantially transparent over the operational wavelength range;
the one or more diffractive optical elements are positioned on or within the solid material;
the one or more reflective optical elements are positioned on the solid material; and
an optical signal propagating between the multiplexed transmission region and one of the demultiplexed transmission regions propagates within the solid material and undergoes one or more internal reflections within the solid material from at least one of the one or more reflective optical elements.

15. The optical apparatus of claim 14 wherein the solid material comprises one or more of a glass, silica, doped silica, a polymer or resin, a dielectric material, or a semiconductor material.

16. The optical apparatus of claim 14 wherein the one or more diffractive optical elements comprise one or more diffraction gratings formed on one or more corresponding grating substrates attached to a surface of the solid material.

17. The optical apparatus of claim 14 wherein the one or more diffractive optical elements comprise one or more diffraction gratings formed on a surface of the solid material.

18. The optical apparatus of claim 14 wherein at least one of the one or more diffractive optical elements is positioned between adjacent portions of the solid material, and portions of the multiplexed or demultiplexed beam paths lie within the solid material.

19. The optical apparatus of claim 14 wherein at least one of the one or more reflective optical elements comprises one or more reflective coatings formed on a surface of the solid material.

20. The optical apparatus of claim 14 wherein at least one of the one or more reflective optical elements comprises an uncoated surface of the solid material at which an optical signal propagating between the multiplexed transmission region and one of the demultiplexed transmission regions undergoes partial or total internal reflection.

21. The optical apparatus of claim 13 wherein:
the optical spacer includes a contiguous enclosed volume;
the enclosed volume is substantially evacuated or contains a gaseous or liquid material substantially transparent over the operational wavelength range;
each one of the one or more diffractive elements and each one of the one or more reflective optical elements forms a corresponding portion of a boundary surface of the enclosed volume; and an optical signal propagating between the multiplexed transmission region and one of the demultiplexed transmission regions propagates within the enclosed volume.

22. The optical apparatus of claim 13 wherein the optical spacer is further structurally arranged to hold the one or more optical sources or receivers in the substantially fixed positions.

23. The optical apparatus of claim 13 further comprising one or more focusing optical elements wherein:
   each one of the focusing optical elements is positioned to be intersected by a corresponding one of the multiplexed or demultiplexed beam paths; and
   the optical spacer is further structurally arranged to hold the one or more focusing optical elements in substantially fixed positions.

24. The optical apparatus of claim 1 wherein the multiplexed transmission region differs from at least one of the demultiplexed transmission regions with respect to grating-normal direction.

25. The optical apparatus of claim 1 wherein the grating-normal vector directions of the demultiplexed transmission regions are substantially parallel to the grating-normal vector direction of the multiplexed transmission region.

26. The optical apparatus of claim 25 wherein the multiplexed transmission region and the demultiplexed transmission regions are substantially coplanar.

27. The optical apparatus of claim 1 wherein each demultiplexed transmission region differs from at least one other demultiplexed transmission region with respect to grating wavevector magnitude or direction.

28. The optical apparatus of claim 27 wherein (i) the one or more diffractive optical elements include multiple distinct transmission diffraction gratings and (ii) two or more among the multiple distinct diffraction gratings include one or more of the demultiplexed transmission regions.

29. The optical apparatus of claim 27 wherein the demultiplexed transmission regions comprise spatially distinct regions of a single transmission diffraction grating having spatially varying grating wavevector magnitude or direction.

30. The optical apparatus of claim 1 wherein the demultiplexed beam paths are substantially parallel to one another upon intersecting the corresponding demultiplexed transmission regions.

31. The optical apparatus of claim 30 wherein substantially parallel portions of the demultiplexed beam paths are substantially evenly spaced apart.

32. The optical apparatus of claim 30 wherein substantially parallel portions of the demultiplexed beam paths are substantially parallel to a portion of the multiplexed beam path that intersects the multiplexed transmission region.

33. The optical apparatus of claim 1 wherein the operation wavelength range is (i) about 800 nm to about 900 nm or (ii) about 1200 nm to about 1700 nm.

34. A method for using the optical apparatus of claim 1 wherein the set of multiple optical sources or receivers comprises a set of multiple optical receivers, the method comprising:
   directing a multiplexed optical signal to propagate along the multiplexed beam path to the multiplexed transmission region, wherein the multiplexed optical signal comprises a corresponding optical signal at each of two or more different corresponding wavelengths in the operational wavelength range; and
   receiving each corresponding optical signal at the corresponding optical receiver,
   wherein each corresponding optical signal propagates from the corresponding demultiplexed transmission region along the corresponding demultiplexed beam path to the corresponding optical receiver.

35. A method for using the optical apparatus of claim 1 wherein the set of multiple optical sources or receivers comprises a set of multiple optical sources, the method comprising emitting a corresponding optical signal from each of two or more of the optical sources at two or more different corresponding wavelengths in the operational wavelength range to propagate along the corresponding demultiplexed beam path to the corresponding demultiplexed transmission region, wherein the corresponding optical signals propagate from the multiplexed transmission region along or substantially parallel to the multiplexed beam path as a multiplexed optical signal.

* * * * *